United States Patent
Kang et al.

(10) Patent No.: US 8,580,227 B2
(45) Date of Patent: Nov. 12, 2013

(54) METHOD FOR PRODUCING HYDROGEN USING BLOCK COPOLYMER AND OXIDATION REACTION OF METALS

(75) Inventors: Jeung-Ku Kang, Daejeon (KR); Weon-Ho Shin, Daejeon (KR); Jun-Hyeon Bae, Daejeon (KR); Jung-Hoon Choi, Daejeon (KR); Cheol-Ock Song, Daejeon (KR); Kyung-Min Choi, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 352 days.

(21) Appl. No.: 12/740,010

(22) PCT Filed: Jun. 17, 2008

(86) PCT No.: PCT/KR2008/003399
§ 371 (c)(1),
(2), (4) Date: Apr. 27, 2010

(87) PCT Pub. No.: WO2009/088134
PCT Pub. Date: Jul. 16, 2009

(65) Prior Publication Data
US 2010/0239494 A1    Sep. 23, 2010

(30) Foreign Application Priority Data
Jan. 4, 2008    (KR) .................. 10-2008-0001145

(51) Int. Cl.
*C01B 3/08*    (2006.01)
(52) U.S. Cl.
USPC ......... 423/658; 423/644; 423/648.1; 423/657
(58) Field of Classification Search
USPC .................. 423/644, 648.1, 657, 658
See application file for complete search history.

(56) References Cited

U.S. PATENT DOCUMENTS

| 7,592,292 B2 | 9/2009 | Tsai et al. |
| 2007/0218120 A1 | 9/2007 | Lee et al. |

(Continued)

FOREIGN PATENT DOCUMENTS

| KR | 1020060034713 A | 4/2006 |
| KR | 100621190 B1 | 9/2006 |

(Continued)

OTHER PUBLICATIONS

Bhaviripudi et al. "Block-copolymer assisted synthesis of arrays of metal nanoparticles and their catalytic activities for the growth of SWNTs." Nanotechnology 17 (2006) 5080-5086.*

(Continued)

*Primary Examiner* — Paul Wartalowicz
(74) *Attorney, Agent, or Firm* — Sterne, Kessler, Goldstein & Fox P.L.L.C.

(57) ABSTRACT

The present inventions are a method for production of hydrogen which decomposes water into hydrogen by oxidation of metals only when the metals are exposed to the water, while preventing oxidation of pure metal nanoparticles using block copolymers and, in addition, hydrogen produced by the method described above. The method of the present invention has advantages of improved convenience and simplicity, achieves a preferable approach for hydrogen storage because the metal nanoparticles enclosed by the block copolymer have the ease of delivery and reaction thereof. Additionally, the method of the present invention only using water and the metal is considered eco-friendly and useful in industrial energy applications.

7 Claims, 1 Drawing Sheet

(56) References Cited

U.S. PATENT DOCUMENTS

2008/0019903 A1* 1/2008 Wegner .................... 423/657
2008/0248338 A1* 10/2008 Yano et al. ................ 429/13

FOREIGN PATENT DOCUMENTS

| KR | 100696254 B1 | | 3/2007 |
| KR | 100732013 B1 | | 6/2007 |
| WO | WO 02/08818 A1 | | 1/2002 |
| WO | WO 2005/118465 | * | 12/2005 |
| WO | WO 2006/038519 | * | 4/2006 |

OTHER PUBLICATIONS

Hamley. "Nanostructure fabrication using block copolymers." Nanotechnology 14 (2003) R39-R54.*

Sohn, B.-H., et al., "Directed Self-Assembly of Two Kinds of Nanoparticles Utilizing Monolayer Films of Diblock Copolymer Micelles," *J. Am. Chem. Soc.* 125:6368-6369, American Chemical Society, United States (2003).

Spatz, J., et al., "Ordered Deposition of Inorganic Clusters from Micellar Block Copolymer Films," *Langmuir* 16:407-415, American Chemical Society, United States (2000).

Li, X., et al., "High-Density Arrays of Titania Nanoparticles Using Monolayer Micellar Films of Diblock Copolymers as Templates," *Langmuir* 21:5212-5217, American Chemical Society, United States (2005).

International Search Report for International Application No. PCT/KR2008/003399, mailed on Jul. 17, 2008, Korean Intellectual Property Office, Republic of Korea (2008), 2 pages.

* cited by examiner

METHOD FOR PRODUCING HYDROGEN USING BLOCK COPOLYMER AND OXIDATION REACTION OF METALS

TECHNICAL FIELD

The present invention relates to a method for production of hydrogen using block copolymers and oxidation reaction of metals, and more particularly, to a method for production of hydrogen which decomposes water into hydrogen by oxidation of metals only when the metals are exposed to the water, while preventing oxidation of pure metal nanoparticles using block copolymers, and in addition, hydrogen produced by the method described above.

BACKGROUND ART

Fossil fuels contribute at least 90% of the present energy demand. However, the fossil fuels are consumable materials which cannot be regenerated once used, are limited in quantity and extremely harmful to the environment due to pollution substances such as carbon dioxide gas generated during combustion, thus raising significant environmental problems.

Hydrogen energy is attracting increasing interest as a new and clean energy resource capable of replacing fossil fuels, in particular, hydrogen is a material greatly coming into the spotlight as an alternative energy source while fossil fuels are being rapidly exhausted. Hydrogen energy has various benefits such as high energy efficiency to mass, water generated as the only residue, etc., thus satisfying advantageous conditions for a future fuel.

However, for use of hydrogen, it is necessary to use a specific medium for safe storage and delivery of hydrogen. Although massive research and investigations have been conducted to solve this problem, there is still no proposal for an ideal solution satisfying requirements suggested by the US department of energy (DOE).

Additionally, a variety of studies for formation of metal nanoparticles have been conducted, including, for example, that using block copolymers resulting in formation of metal nanoparticles such as iron oxide ($Fe_3O_4$)(B. Y. Sohn et al., J. Ame. Chem. Soc. 125, 6368, 2003), gold (J. P. Spatz et al., Langmuir 16, 407, 2000), titanium oxide (X. Li, et al., Langmuir 21, 5212, 2005) and the like. However, there is still a need for the development of novel methods to apply the metal nanoparticles formed above in the production of hydrogen.

DISCLOSURE OF INVENTION

Technical Problem

Accordingly, the present invention is directed to solve the problems described above in regard to conventional methods and an object of the present invention is to provide a novel method for production of hydrogen, controlling the generation of hydrogen which decomposes water into hydrogen by oxidation of metals only when the metals are exposed to water, while preventing oxidation of pure metal nanoparticles using block copolymers.

Another object of the present invention is to provide hydrogen produced by the method described above.

Technical Solution

In order to accomplish the above object, the present invention provides a method for production of hydrogen comprising: (a) forming metal nanoparticles from metal salts by using a block copolymer; and (b) exposing the formed metal nanoparticles to water to generate $H_2$.

In order to accomplish the another object, the present invention also provides $H_2$ produced by the method described above.

Advantageous Effects

A method for production of hydrogen according to the present invention exhibits various advantages in that oxidation of metal elements can be prevented by covering an outer surface of the metal nanoparticles with the block copolymer, and the metal nanoparticles un-oxidized by covering with the block copolymer can be conveniently delivered in a pure state and, if necessary, exposed to water, thereby easily generating hydrogen.

Accordingly, the metal nanoparticles enclosed by the block copolymer which have the ease of delivery and reaction thereof, becomes a preferable carrier to store hydrogen therein. Also, the hydrogen production method of the present invention only using the water and the metals is more preferable in environmental aspects.

BEST MODE FOR CARRYING OUT THE INVENTION

Figure 1:
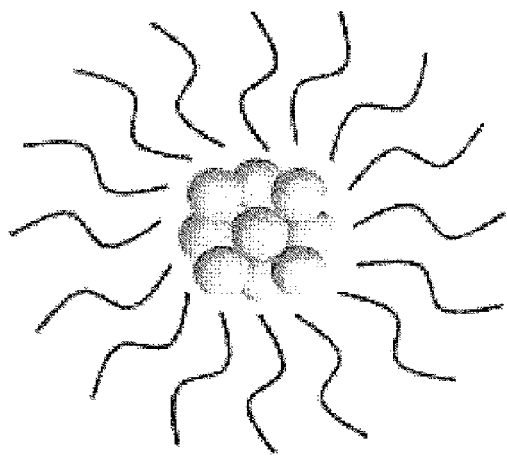
FIG. 1 is a diagram illustrating an aluminum nanoparticle enclosed by a block copolymer according to Example 1 of the present invention.

In accordance with an aspect of the present invention, there is provided a method for production of $H_2$ comprising: (a) forming metal nanoparticles from metal salts by using a block copolymer; and (b) exposing the formed metal nanoparticles to water to generate $H_2$.

The block copolymer used in the present invention includes a combination of hydrophilic and hydrophobic ingredients. The block copolymer is not particularly limited but includes any materials that can form micelles by self-assembly where it is dissolved in a solvent, in particular, an organic solvent.

Particular examples of the block copolymer includes: poly(styrene-block-4-vinylpyridine); poly(styrene-block-2-vinylpyridine); poly(styrene-block-ethylene oxide); poly(styrene-block-methacrylic acid); poly(styrene-block-acrylic acid), etc. In view of forming micelles in a non-polar solvent such as toluene, preferable is poly(styrene-block-4-vinylpyridine).

The block copolymer of the present invention has features of preventing surface oxidation of metals and being dissolved when exposed to water.

The solvent used in the present invention may include water, toluene, N,N-dimethylformamide, ethyl acetate, methylene chloride, chloroform, acetone, dimethylsulfoxide, N-methylpyrrolidone, dioxane, tetrahydrofuran, methylethylketone, acetonitrile, hexane, methanol, ethanol and/or mixtures thereof, however, the present invention is not limited thereto.

In the method for production of $H_2$ according to the present invention, the step (a) includes a process of self-assembly of the block copolymer in a solvent to prepare micelles and addition of metal salts to the inner part of the micelles to complete formation of metal nanoparticles. That is, the step (a) is characterized in a process of preparing micelles based on the block copolymer that forms a structure of which the micelles enclose the metal nanoparticles.

The metal applied in the method of the present invention is not particularly limited so far as it can generate $H_2$ by oxidation in water and includes, for example, aluminum (Al), iron (Fe), titanium (Ti), nickel (Ni), cobalt (Co), etc. Al is more preferable, which is a lightweight metal and has high generation of $H_2$ relative to mass and high reaction rate.

For Al as an illustrative example of the metal, oxidation of Al is performed by the following chemical reaction shown in reaction equation (1):

$$2Al + 3H_2O \rightarrow Al_2O_3 + 3H_2 \quad (1)$$

The above chemical reaction is a clean reaction to generate $H_2$ only using water and can produce a relatively large amount of $H_2$ such as 5.3% by weight. However, a pure Al element is susceptible to react with moisture and/or oxygen in the atmosphere, which in turn, forms an oxide film. Herein, Al with the oxide film cannot further react, thus causing a significant reduction in generation of $H_2$.

The metal salt used in the present invention is not particularly limited and may include acetate salts, chloride salts and the like, in which metal elements are contained.

The method of the present invention is characterized by a specific structure of the metal nanoparticle wherein the metal nanoparticle is enclosed by the block copolymer. Such a structure is effective to prevent oxidation of the metal nanoparticles.

FIG. 1 is a diagram illustrating Al nanoparticles enclosed by the block copolymer according to Example 1 of the present invention. Spherical portions in the center of the structure comprise Al nanoparticles while the materials surrounding the Al nanoparticles are the block copolymer. The block copolymer surrounding the Al nanoparticles functions to prevent oxidation of Al.

With regard to the method for production of $H_2$ according to the present invention, an outer surface of the block copolymer has a hydrophobic structure.

In the method for production of $H_2$ according to the present invention, the step (b) is characterized in selective oxidation of the metal nanoparticles, more particularly, allowing oxidation of the metal nanoparticles such as pure Al nanoparticles in water ($H_2O$) only when the metal nanoparticles are exposed to water, thereby controlling the generation of $H_2$.

Figure 2:
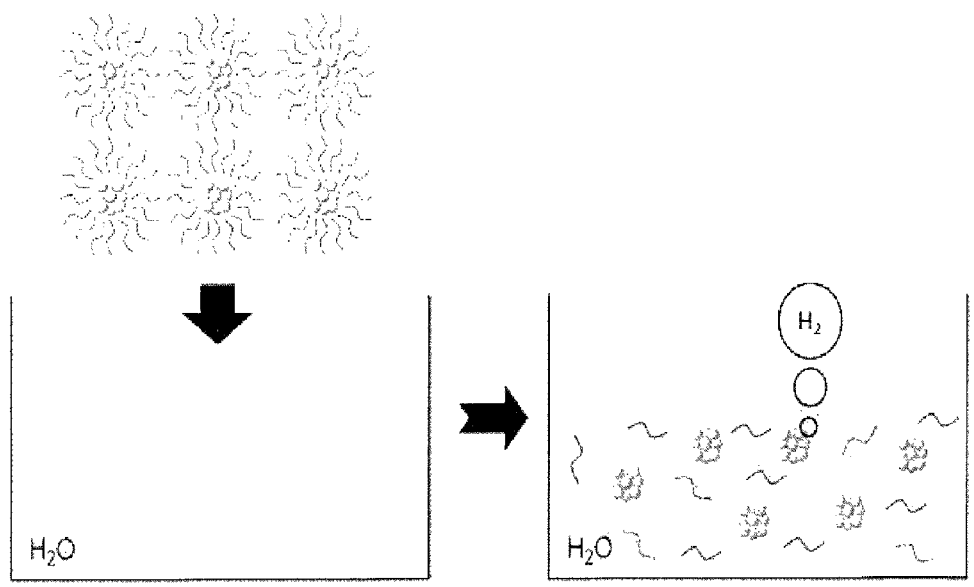
FIG. 2 is a schematic view illustrating a process of generating $H_2$ in the aluminum nanoparticle that was enclosed by the block copolymer according to Example 1 of the present invention.

FIG. 2 is a schematic view illustrating a process of generating $H_2$ from Al nanoparticles enclosed by the block copolymer according to Example 1 of the present invention. The block copolymer is dissolved in water to expose pure Al nanoparticles and the exposed Al nanoparticles generate $H_2$ via oxidation in water.

In accordance with another aspect of the present invention, there is provided $H_2$ produced by the above method.

The produced $H_2$ is decomposed from water by oxidation of a metal, therefore, has an advantage of being generated by a clean reaction only using water.

Hereinafter, the present invention will be described in more detail from the following examples with reference to the accompanying drawings. However, these are intended to illustrate the invention as preferred embodiments of the present invention and do not limit the scope of the present invention.

EXAMPLE 1

Production of $H_2$ Using poly(styrene-block-4-vinylpyridine) and Al

In order to form micelles using a block copolymer, poly(styrene-block-4-vinylpyridine) ($M_n^{PS}$=47,600 g/mol, $M_n^{PVP}$=20,600 g/mol, polydispersity index=1.14) was dissolved in toluene. The dissolved poly(styrene-block-4-vinylpyridine) had a concentration of 0.5 wt %, which is suitable to form micelles with poly(styrene-block-4-vinylpyridine.) The micelles had a specific structure that a hydrophobic polystyrene portion forms an outer corona while a hydrophilic polyvinylpyridine portion forms an inner core.

To a solution containing poly(styrene-block-4-vinylpyridine) micelles, 1 wt % of aluminum chloride was added, followed by stirring for 3 days to prepare micelles having uniform distribution. Each of the prepared micelles had the structure shown in FIG. 1. Referring to FIG. 1, it is observed that the micelle contains a pure Al part therein while poly(styrene-block-4-vinylpyridine) surrounds the pure Al part.

Following this, the prepared micelles were mixed with water to generate $H_2$ while degrading the structure of the micelle.

Polyvinylpyridine as the core portion was hydrophilic and tended to contact water and, as a result, the pure Al part was exposed to water during degradation of the micelle structure. Al has a strong oxidation potential, therefore, oxidation of Al occurred according to the reaction equation 1 described above when Al contacted with water, resulting in $H_2$ generation.

EXAMPLE 2

Production of $H_2$ Using poly(styrene-block-acrylic acid) and Fe

In order to form micelles using a block copolymer, poly(styrene-block-acrylic acid) ($M_n^{PS}$=16,400 g/mol, $M_n^{PAA}$=4,500 g/mol, polydispersity index=1.05) was dissolved in toluene. The dissolved poly(styrene-block-acrylic acid) had a concentration of 1.5 wt %, which is suitable to form micelles with poly(styrene-block-acrylic acid). The micelles have a specific structure that a hydrophobic polystyrene portion forms an outer corona while a hydrophilic polyacrylic acid portion forms an inner core.

To a solution containing poly(styrene-block-acrylic acid) micelles, 1 wt. % of iron chloride was added, followed by stirring for 3 days to prepare micelles having uniform distribution. Each of the prepared micelles has the structure that the micelle contains a pure Al part therein while poly(styrene-block-acrylic acid) surrounds the pure Al part.

Following this, the prepared micelles were mixed with water to generate $H_2$ while degrading the structure of the micelle.

Polyacrylic acid as the core portion was hydrophilic and tended to contact with water and, as a result, the pure Fe part was exposed to water during degradation of the micelle structure. Oxidation of Al occurred when Al contacted water, resulting in $H_2$ generation.

While the present invention has been described with reference to the accompanying preferable examples, it will be understood by those skilled in the art that various modifications and variations may be made therein without departing from the scope of the present invention as defined by the appended claims.

Industrial Applicability

A method for production of $H_2$ according to the present invention has advantages of improved convenience and simplicity and achieves a more creative approach in storage and use of $H_2$. The method of the present invention only using water is considered eco-friendly and useful in industrial energy applications.

The invention claimed is:

1. A method for production of hydrogen ($H_2$) comprising: (a) forming metal nanoparticles from metal salts by using a block copolymer; and (b) exposing the formed metal nanoparticles to water to generate $H_2$ by oxidation of the metal nanoparticles with water,
  wherein the step (a) includes a process of: self-assembly of the block copolymer to prepare micelles; and addition of metal salts selected from the group consisting of iron (Fe), nickel (Ni) and cobalt (Co) to the inner part of the micelles to complete formation of the metal nanoparticles,
  wherein the formed metal nanoparticles in the step (a) have a structure of being enclosed by the block copolymer, and
  wherein the block copolymer, that encloses the formed metal nanoparticles, is dissolved in the water in the step (b) to expose the metal nanoparticles to water.

2. The method according to claim 1, wherein the block copolymer is dissolved in a solvent and forms the micelles by self-assembly thereof.

3. The method according to claim 1, wherein the block copolymer is at least one selected from the group consisting of poly(styrene-block-4-vinylpyridine), poly(styrene-block-2-vinylpyridine), poly(styrene-block-ethyleneoxide), poly(styrene-block-methacrylic acid) and poly(styrene-block-acrylic acid).

4. The method according to claim 2, wherein the solvent is at least one selected from the group consisting of water, toluene, N,N-dimethylformamide, ethyl acetate, methylene chloride, chloroform, acetone, dimethylsulfoxide, N-methylpyrrolidone, dioxane, tetrahydrofuran, methylethylketone, acetonitrile, methanol and ethanol.

5. The method according to claim 1, wherein the metal salts include acetate salts or chloride salts.

6. The method according to claim 1, wherein the block copolymer has a hydrophobic structure at an outer surface thereof.

7. The method according to claim 1, wherein the step (b) includes selective oxidation of the metal nanoparticles with the water.

* * * * *